May 2, 1933.  A. GRANDE  1,906,375
FOOD PACKAGE AND METHOD OF PREPARING THE SAME
Filed June 30, 1930  2 Sheets-Sheet 1
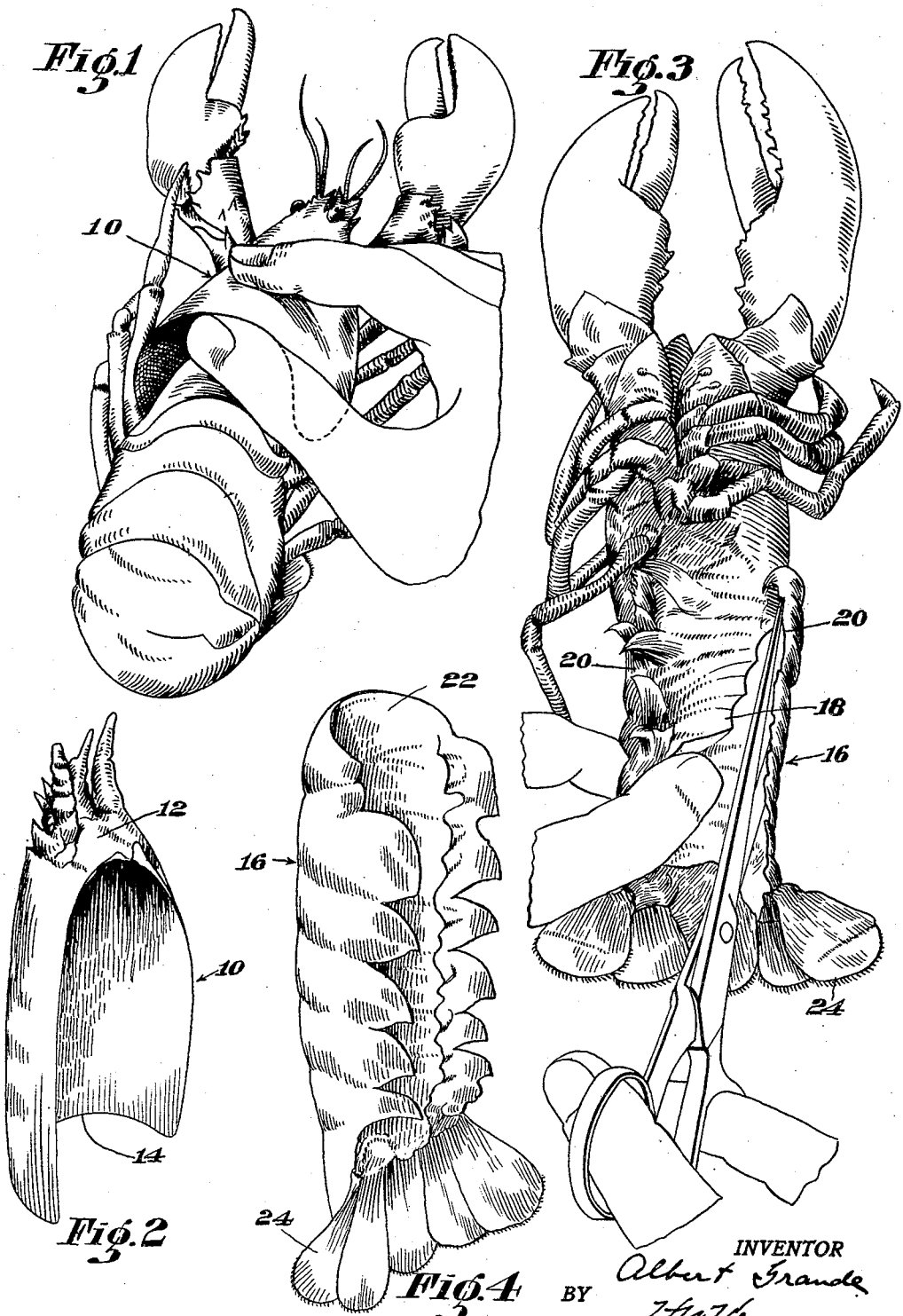

May 2, 1933.  A. GRANDE  1,906,375
FOOD PACKAGE AND METHOD OF PREPARING THE SAME
Filed June 30, 1930    2 Sheets-Sheet 2

INVENTOR
BY Albert Grande
ATTORNEY

Patented May 2, 1933

1,906,375

UNITED STATES PATENT OFFICE

ALBERT GRANDE, OF BOSTON, MASSACHUSETTS, ASSIGNOR TO BEAU IDEAL FOOD CO., OF BOSTON, MASSACHUSETTS, A CORPORATION OF MASSACHUSETTS

FOOD PACKAGE AND METHOD OF PREPARING THE SAME

Application filed June 30, 1930. Serial No. 464,854.

This invention relates to a new and improved method of preparing and packing crustacean or shell fish food products and to the new and commercial food package so produced. These products, and especially those derived from lobsters, are most commonly prepared for consumption directly from the live crustacean. When prepared and packed in tins for commercial distribution, only the edible portions of the shell fish are retained and preserved, the shells and other non-edible portions being discarded. In one aspect my invention comprises a new method of preparing and packing the flesh of shell fish within the shells thereof and by the practice of this method I am enabled more fully to protect the flesh against deterioration, to provide an attractive product and to retain the shells, making them available for serving purposes.

While my invention is particularly applicable to the preparation of the flesh of lobsters and is described in that connection, it will, of course, be understood that its general scope is considerably broader. The shell of a lobster is a natural protection to the flesh and, furthermore, it renders the lobster particularly attractive to both the eye and palate of the consumer. In accordance with my invention, I propose so to prepare the lobsters that both the flesh and shells are retained and the former packed in and protected by the latter. As thus combined, the product may be packed within a suitable container, preferably transparent, whereby the package is rendered particularly attractive since the smooth brightly-colored portions of the shell will be conspicuously exposed to view. The novel relative arrangement of the shells as hereinafter described provides full protection to the flesh therein and suggests the natural appearance of the live lobster.

Fresh lobster is most commonly served directly in the shell and an important advantage resulting from the practice of my invention is that it facilitates this desirable method of serving the lobster at any season of the year. As heretofore described, I may prepare and pack the shell fish in various ways to accomplish this result. These several methods are characterized by the use of one or both of the anterior and posterior shells of the crustacean, the packing of the flesh food product therein, the placing of the shells together to house and protect the food product, and finally by the packing of the enclosed product in a suitable container, preferably transparent, so that the shells will be maintained in their assembled relation. My invention includes within its scope the novel food package incorporating these characteristic features.

In the accompanying drawings I have shown certain specific forms of my invention but it will be understood that the invention can be otherwise embodied and that the drawings are not to be construed as defining or limiting the scope of the invention, the claims appended hereto being relied upon for that purpose.

Referring to the figures of the drawings,

Fig. 1 illustrates the step of removing the anterior shell from a lobster;

Fig. 2 illustrates the anterior shell removed from the body;

Fig. 3 illustrates the manner of removing the flesh portion from the posterior shell;

Fig. 4 illustrates the posterior shell removed from the body;

Figure 5:
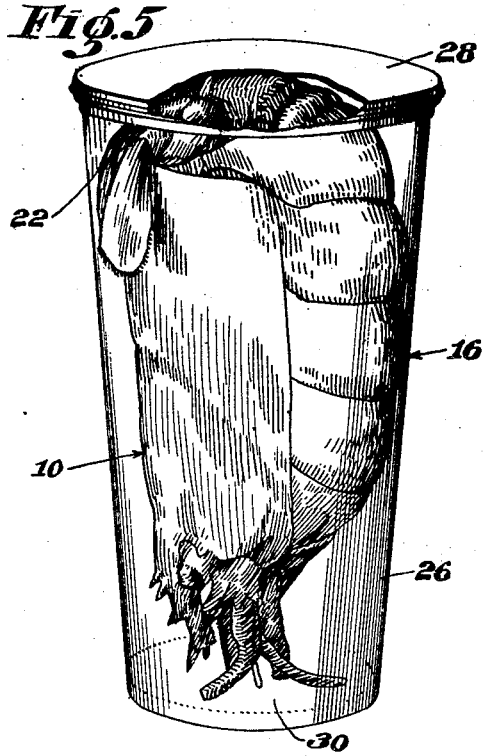
Fig. 5 illustrates one manner of assembling the anterior and posterior shells of a lobster to enclose the meat thereof, the combined shells being shown within a transparent jar.

Describing my invention in connection with the lobsters illustrated in the accompanying drawings, I first cook the lobsters and then prepare them in the following manner. The anterior shell 10 is first removed and this is done by engaging the thumb beneath the rear edge of the shell, as shown in Fig. 1, and lifting the shell from the body. The shell as thus removed is shown in Fig. 2. It will be noted that the head and its several appendages are a part of this shell and thus remain attached thereto to retain the full natural appearance of the fish. It will be further noted that the head end 12 of the shell is closed and the rear end 14 thereof open.

In preparing the posterior shell 16, I prefer to first remove the flesh therefrom although the shell may be first removed from the body, if desired. My process is illustrated in Fig. 3 and consists of first severing the cartilage 18 from the shell at its two side edges 20 and then removing the cartilage and flesh from the shell and the shell from the body. This last step requires only a bending of the shell, whereupon it will break away from the body. It will be noted that this shell is open at its forward end 22 and retains the tail fins 24 on its rear end. The shells 10 and 16 may be rinsed and the inner walls thereof washed if necessary or desirable.

The edible flesh of the lobsters may be removed and packed directly into the shells or it may be prepared into any of various lobster edibles such, for example, as lobster salid. It will be understood that this preparation of the edible does not enter into the novelty of my invention and can, therefore, be carried out in any desirable or approved manner.

In forming the product shown in Fig. 5, I preferably proceed by packing the edible into the posterior shell 16, it being understood that the edible is packed tightly thereinto and that the same may be packed to a well rounded or overflowing capacity. I then place the anterior shell 10 thereonto in the relative endwise relation shown in Figs. 2 and 4 and slide the two shells together to the relative position shown in Fig. 5. In this position the closed end 12 of the shell 10 closes the open end 22 of the shell 16 and the body portions of the shells entirely enclose the food product therein. The tail fins 24 are then bent downwardly over the open end 14 of the shell 10 in a manner entirely enclosing the product therein. As thus assembled or combined, the two shells form a complete housing for the edible product and I preferably so pack the same that the shells remain in this protecting position.

As illustrated in Fig. 5, I preferably pack my improved product in transparent jars whereby the natural appearance of the fish presents a very attractive display. In carrying out this step of my invention, I prefer to use a jar 26 of a size and length to snugly receive and hold the product. When packed into such a jar, the sides of the jar hold the two shells together in a manner fully protecting the food product therein and the ends of the shells are engaged by the cover 28 and jar bottom 30 in a manner holding the shells together endwise and holding the tail fins 22 tightly closed over the end 14 of the shell 10. As thus packed, the food product is entirely enclosed and shielded from light deterioration within its natural protecting shells and the shells and contents are preserved and held in secure position within the jar, the product being visible in its naturally protected state. If the jar will not readily permit packing the full number of fins 24, the two outer of these fins may be removed.

Figure 6:
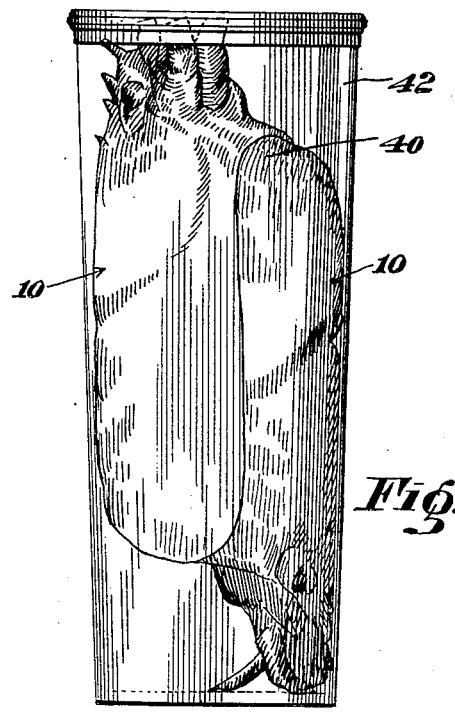
Fig. 6 illustrates a method of packing the product within two anterior shells.

While the product shown in Fig. 5 can be served from the shells if desired, I may proceed in the following manner to provide a product particularly adapted for this purpose. According to this variation of my invention, I pack two like shells, illustrated as anterior shells 10 in Fig. 6, each with a single serving of the lobster flesh or an edible prepared therefrom, the shells being filled to a capacity which will permit a combining thereof as illustrated. It is intended that this edible shall be served directly in the shell and removed therefrom only as eaten and I therefore provide a separator between the two servings. This separator may conveniently be in the form of a waxed paper cover placed over the edible serving as the shells are packed. When two of the filled shells are placed together, as illustrated in Fig. 6, the edible is entirely enclosed therein in a fully protective manner. This product 40 is preferably packed in a transparent jar 42 in the manner above described in connection with the jar 26. To serve the product, it is only necessary to remove it from the jar and separate the two shells.

Figure 7:
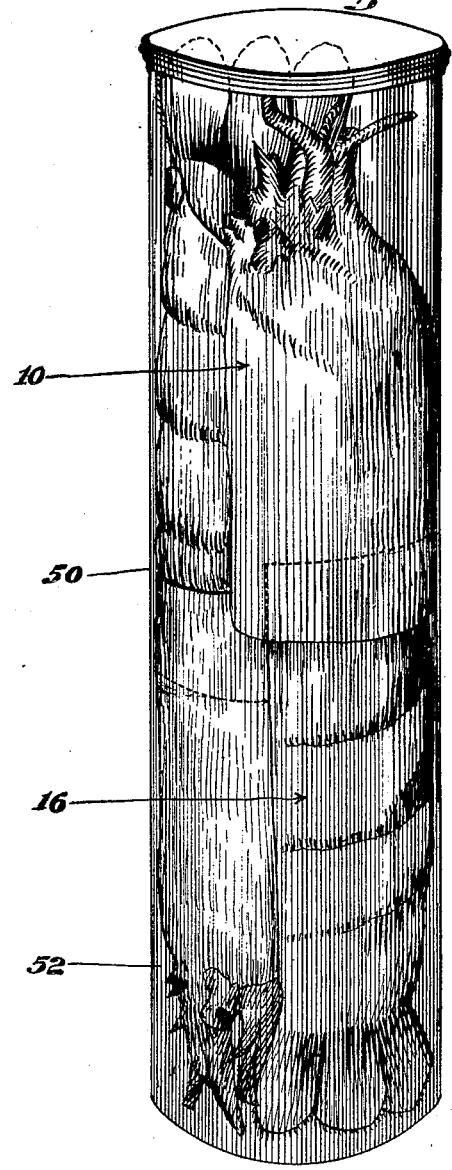
Fig. 7 illustrates a method of packing the product within the combined anterior and posterior shells of two lobsters.

I have illustrated a further variation of my invention in Fig. 7. In accordance with this procedure, I place the anterior and posterior shells of each lobster together in their natural arrangement and pack the edible thereinto, preferably placing a suitable cover, as waxed paper, over each serving as the shells are filled. Two pairs of the filled shells are then placed together, as illustrated in Fig. 7. The two shells 50 as thus combined are preferably packed in a transparent jar 52, the jar being of a size and length to snugly receive and hold the shells in their assembled relation. The anterior and posterior shells 10 and 16 will preferably be placed together with the shell 16 telescoping somewhat into the shell 10, the amount of such telescoping depending upon the length of the jar 52, whereby the product will fit snugly against the ends of the jar.

It is believed that further elaboration of my invention herein is unnecessary to its full comprehension. In brief, the shells are removed and the flesh edible packed thereinto as described, either for use in the shells in the serving or otherwise. When packed in containers in the snug manner described, the shells remain tightly closed about the edible and fully protect it from exposure to light and, since only the exterior surface of the shell is visible, the finished product presents a most attractive appearance.

Having thus described my invention, what I claim as new and desire to secure by Letters Patent is:

1. A method of preparing and packing lobsters having anterior and posterior hollow shells, consisting in removing the shells from the lobsters, placing the shells side by side with their hollowed out portions opposite each other to form a generally rounded hollowed-out shell casing, packing the edible portions of the lobsters in the hollowed-out portion between the shells, and confining the exterior rounded mass of shell casing containing the edible portions of the lobsters in an outer transparent casing to engage the product and hold the shells in their assembled relation.

2. A marketable food package comprising a pair of elongated outwardly-curved shells from the body of a lobster placed side by side with their hollowed-out portions opposite each other to form a generally rounded hollowed-out shell casing with the edible portion of the lobsters packed in the hollowed-out portion between the shells, a separator between the contents of the two shells, and a transparent casing fitting around the exterior surface of the shells to engage the product and hold the shells in their assembled relation.

3. A marketable food package comprising a pair of outwardly-curved anterior and posterior lobster shells placed side by side with their hollowed-out portions opposite each other to form a generally rounded hollowed-out shell casing with the tail of one shell portion opposite the head of the other shell portion to form a generally rounded hollowed-out shell casing with the edible portion of the lobster packed in the hollowed-out portion between the shells, and a casing fitting around the exterior surface of the two shells to engage the product and hold the shells in their assembled relation.

ALBERT GRANDE.